United States Patent [19]

Tokuoka et al.

[11] Patent Number: 4,670,337

[45] Date of Patent: Jun. 2, 1987

[54] MAGNETIC RECORDING MEDIUM

[75] Inventors: Yasumichi Tokuoka; Hitoshi Arai; Norio Higuchi; Hideki Hotsuki, all of Saku, Japan

[73] Assignee: TDK Corporation, Tokyo, Japan

[21] Appl. No.: 760,018

[22] Filed: Jul. 29, 1985

[30] Foreign Application Priority Data

Aug. 27, 1984 [JP] Japan ................. 59-176810

[51] Int. Cl.$^4$ ............................................. G11B 5/68
[52] U.S. Cl. ................................. 428/323; 428/329; 428/694; 428/900
[58] Field of Search ............... 428/329, 323, 694, 900; 421/128

[56] References Cited

U.S. PATENT DOCUMENTS

| | | | |
|---|---|---|---|
| 4,328,935 | 5/1982 | Steel | 428/694 |
| 4,420,408 | 12/1983 | Kajimoto et al. | 428/694 |
| 4,420,532 | 12/1983 | Yamaguchi et al. | 428/694 |
| 4,425,400 | 1/1984 | Yamaguchi et al. | 428/694 |
| 4,571,362 | 2/1986 | Sato et al. | 428/694 |

Primary Examiner—Paul J. Thibodeau
Attorney, Agent, or Firm—Seidel, Gonda, Goldhammer & Abbott

[57] ABSTRACT

In a magnetic recording medium comprising a base and a magnetic coating layer formed thereon which consists of ferromagnetic particles dispersed in a binder, the magnetic layer contains from 3 to 15 percent by weight, on the basis of the magnetic powder weight, of abrasive particles having a Mohs hardness of 6 or upward, in such a manner that the average number of the abrasive particles per unit area of the magnetic layer surface is at least 0.25 per square micron. The magnetic powder is a magnetic metal powder based on iron, and the abrasive particles are angular rather than granular in shape.

4 Claims, No Drawings

MAGNETIC RECORDING MEDIUM

BACKGROUND OF THE INVENTION

This invention relates to a magnetic recording medium, and more specifically to a high-density magnetic recording medium.

Magnetic recording media as magnetic tapes, disks and the like are in wide use for audio and video recording-reproducing units and for computers. In these fields, intensive researches are being pursued for the development of higher density media. As is well known, the magnetic recording system basically performs recording and reproduction of signals with a magnetic head. Therefore, realization of a higher density medium calls for some means to minimize the loss between the medium and the head in addition to the means for improving the magnetic properties of the medium and achieving uniform distribution of magnetic particles in the magnetic layer of the medium. Efforts have been exerted, for instance, to make the magnetic layer surface as smooth as possible and thereby lessen the tape-head separation loss. Improvements in contact between the head and the medium with smoother mirror finish have, however, been attained at some sacrifice of the strength of the magnetic layer. This has been found to pose new problems of the magnetic coating coming off upon contact with the head, deposition of the magnetic powder on the head, and eventual head clogging. As a solution to these and other problems it has been practiced to add a small amount of abrasive particles having an average particle diameter of about one micron to the magnetic coating. The particles usually used as the abrasive are those of $Al_2O_3$, $Cr_2O_3$, SiC, $\alpha Fe_2O_3$ and the like. They are added as sparsely as feasible to the surface portion of the magnetic layer to avoid deterioration of the electromagnetic conversion characteristics and minimize the wear of the head. With the common practice, however, it has been found that the pursuit of higher density for the magnetic recording medium, through the addition of finer magnetic powder, increase in coercive force, and smoothening of the magnetic coating surface, is accompanied with drawbacks of inadequate tape strength and inability of maintaining the head in an optimum condition with respect to the higher density medium.

The present invention is based on a thorough review of the role the abrasive plays and consequent discovery of conditions essential for the manufacture of a higher density recording medium.

BRIEF SUMMARY OF INVENTION

This invention has for its object the provision of an excellent magnetic recording medium which exhibits markedly improved abrasion for the magnetic head and high cleaning effect without any problem of head clogging, seizure, or discoloration.

The above object is realized in accordance with the composition of the invention characterized in that, in a magnetic recording medium including a base formed with a magnetic layer thereon which consists of ferromagnetic particles dispersed in a binder, the magnetic layer contains abrasive particles having a Mohs hardness of 6 or upward in an amount from 3 to 15 percent by weight on the basis of the magnetic powder weight, the average number of the abrasive particles per unit area of the magnetic layer surface being at least 0.25 per square micron.

DETAILED DESCRIPTION

Our research has revealed that, except when it is too small or too large, the abrasive powder content in the magnetic layer does not have a direct bearing upon the surface properties of the layer or dependent electromagnetic characteristics and upon their influences on the magnetic characteristics of the head. We made a number of magnetic tapes using varied magnetic coating materials in which abrasive particles were dispersed in different ways. The tapes were set on commercially available video taperecorders remodelled into video decks. Using magnetic heads of Sendust, the recording-reproduction characteristics of the magnetic tapes with a center recording wavelength of 0.75 $\mu$m and the surface conditions of the magnetic heads were determined. It was then found that extremely wide variations in these characteristics could result from differences in the dispersed state of the abrasive even those the percentages contained were the same. Our further investigations into the causes of the variations made it clear that, in high density recording with recording wavelengths of approximately or less than one micron, the above-mentioned characteristics are dictated by the dispersed state of the abrasive particles coming out to the magnetic layer surface, that is, by the average number of the exposed particles per unit area of the magnetic layer surface. Thus, fixing the average area density of the abrasive in the surface portion of the magnetic layer at 0.25 piece or more to a square micron has sharply improved the abrasion of the medium. The consequent cleaning effect has solved all the problems of seizure, discoloration, and clogging of the metal head of Sendust or the like. These advantages are more pronounced with metal tapes using iron-based magnetic powder. Further improvements in the favorable effects have been observed by the use of angular-shaped abrasive particles instead of granular ones and also by the choice of finer particles having an average diameter of 0.5 $\mu$m or less.

The abrasive particles to be used in the present invention are inorganic particles of $Al_2O_3$, $Cr_2O_3$, SiC, $\alpha Fe_2O_3$ or the like having a Mohs hardness of 6 or upward and an average particle diameter of about one micron. As for the particle shape, angular rather than granular particles give better result.

The amount of the abrasive particles to be used ranges from 3 to 15 percent by weight (on the basis of the magnetic powder weight). If the amount is less than 3 percent by weight, the abrasive does not have a favorable effect upon the head, but if the amount exceeds 15 percent an output drop results.

The number of abrasive particles per unit area is specified to be 0.25 or more per square micron. If the number is fewer than this, clogging or seizure of the magnetic head can take place. To our knowledge, such a numerical value as specified herein has in no case been a subject of study in the art, and there is not a single recording medium in commercial production or reported in the literature which has a corresponding value.

Any deviation from an adequately dispersed state is adjusted by a proper dispersion method. Timing for the addition of the abrasive particles has a particularly significant effect upon the dispersion.

The invention is illustrated by the following examples.

EXAMPLE 1

One hundred parts by weight of an acicular metal powder composed mainly of iron and having a coercive force of 1450 Oe, saturation magnetic flux density of 110 emu/g, and average length of 0.12 μm, was thoroughly mixed with 50 parts by weight each of a vinyl chloride-vinyl acetate copolymer and a polyurethane resin, 300 parts by weight of methyl ethyl ketone, and 250 parts by weight each of toluene and MIBK. The mixture was then dispersed by a sand grind mill for four hours. Three percent by weight, on the basis of the magnetic powder weight, of $Al_2O_3$ particles having an average particle diameter of 0.5 μm (a product of Sumitomo Chemical Co. marketed under the trade name "AKP20") was added, and the whole mixture was dispersed for another four-hour period to prepare a magnetic coating material. With the addition of a hardener, the coating material was applied to a polyester film base to form a coat thereon which would have a thickness of 3.5 μm upon drying. Following the drying, the coating layer was surfaced by calendering. It was then hardened by heat treatment and slitted to obtain a ribbon of a predetermined width as magnetic tape. For the observation of the $Al_2O_3$ particles exposed at the magnetic layer surface, the tape was photographed at a magnification of 5000X through a scanning electron microscope manufactured by Akashi Plant, Hitachi, Ltd., under the trade designation "DS 130". A total of five electron micrographs were taken of different parts of the tape. The numbers of $Al_2O_3$ particles appearing in the five areas were counted out and averaged to be 102 per picture. Each micrograph measured 11.4 by 8.4 cm, and the size corresponded to 383 $\mu m^2$ of the tape surface area. This meant that the average number of $Al_2O_3$ particles at the tape surface was 0.27 per square micron. On this tape were recorded signals using a Sendust head with a head gap of 0.25 μm, at a tape speed of 3.75 m/sec relative to the head and at a recording frequency of 4.5 MHz, and then the recorded signals were reproduced. Measurements were made in a thermostat at 0° C. During the playback for one hour, the tape in this example underwent no change in output due to clogging of the head. After the measurements the Sendust head surface showed no seizure or color change. The tape was thus found to possess good characteristics as such. On the basis of the same measurement conditions, the reproduction was continued for a two-hour period. Slight head discoloration took place, reducing the output eventually by about 0.5 dB.

For practical purposes the output drop to this degree appeared negligible.

EXAMPLE 2

Magnetic tape was made of exactly the same composition as used in Example 1 except that the abrasive $Al_2O_3$ particles were added at the beginning of the dispersion. The resulting tape was observed and found to contain 75 $Al_2O_3$ particles per micrograph, or 0.2 piece per unit surface area of a square micron. In the same manner as described in Example 1, the tape was used in recording and reproducing signals. The same level of output as measured in the preceding example was obtained. Ten minutes after the start of the playback, momentary output drops due to clogging began to be noted. In one hour the output fell down to −1 dB. The Sendust head surface one hour afterwards showed discoloration due to seizure.

EXAMPLES 3 TO 13

As abrasives, Example 3 used $Al_2O_3$ particles marketed by Sumitomo Chemical under the trade designation "AKP31", Examples 4 to 8 employed "AKP50" by the same manufacturer, and Examples 9 to 11 employed angular particles obtained by modifying the granular "AKP50". Another variety "AKP15" was used in Examples 12 and 13.

Coating materials and tapes were made under the same conditions as used in Example 1 or 2, and the tape characteristics were evaluated in the same way as in Example 1. A summary of the experimental conditions used and the results of evaluation is presented in Table 1. As regards the ratings of head conditions given in the table, a mark of "C" represents a specimen which underwent an output variation due to clogging of the head during one hour of playback and also a specimen with which the head discoloration due to seizure was observed one hour afterwards. A mark of "A" represents a specimen which showed no change during the one-hour reproduction period and remained unchanged for two hours. The output was the value immediately after the start of reproduction and was based on the value in Example 1.

It is obvious from Table 1 that the tape specimens obtained in Examples 1 and 4 to 11 were stable with high outputs.

TABLE 1

| Conditions for addition of abrasive and characteristics obtained | | | | | | | | | | | | | |
|---|---|---|---|---|---|---|---|---|---|---|---|---|---|
| Average particle diameter (μm) | 0.5 | 0.5 | 0.5 | 0.3 | 0.2 | 0.2 | 0.2 | 0.2 | 0.2 | 0.2 | 0.2 | 0.7 | 0.7 |
| Quantity added (wt %) | 3 | 3 | 2 | 5 | 3 | 5 | 10 | 10 | 10 | 15 | 20 | 5 | 10 |
| Particle shape* | Gran. | Gran. | Gran. | Gran. | Gran. | Gran. | Gran. | Gran. | Ang. | Ang. | Ang. | Gran. | Gran. |
| No. of particles at surface: (piece) | | | | | | | | | | | | | |
| No. per micrograph | 102 | 75 | 60 | 150 | 205 | 285 | 450 | 240 | 320 | 700 | 995 | 28 | 61 |
| No. per square micron | 0.27 | 0.20 | 0.16 | 0.39 | 0.54 | 1.00 | 1.17 | 0.63 | 0.84 | 1.83 | 2.60 | 0.07 | 0.16 |
| Head condition: | | | | | | | | | | | | | |
| Seizure-discoloration | B | C | C | B | A | A | A | A | A | A | A | C | C |
| Clogging | B | C | C | B | A | A | A | A | A | A | A | C | C |
| Output, dB** | 0 | 0 | 0 | +1 | +1.5 | +1.5 | +1.5 | +1.5 | +2 | +2 | −0.5 | −0.5 | −1.0 |
| Example No. | 1 | 2 | 3 | 4 | 5 | 6 | 7 | 8 | 9 | 10 | 11 | 12 | 13 |
| Dispersed condition | — | — | Same as Ex. 1 | Same as Ex. 1 | Same as Ex. 1 | Same as Ex. 1 | Same as Ex. 1 | Same as Ex. 2 | Same as Ex. 1 | Same as Ex. 1 | Same as Ex. 1 | Same as Ex. 1 | Same as Ex. 1 |

*"Gran." stands for granular in shape and "Aug." for angular in shape.
**Based on the value in Example 1.

What is claimed is:

1. A magnetic recording medium comprising a base and a magnetic coating layer formed thereon which consists of ferromagnetic particles dispersed in a binder, said magnetic layer containing from 3 to 15 percent by weight, on the basis of the magnetic powder weight, of abrasive particles having a Mohs hardness of 6 or upward, in such a manner that the average number of the abrasive particles per unit area of the magnetic layer surface is at least 0.25 per square micron.

2. A magnetic recording medium according to claim 1 wherein the magnetic powder is a magnetic metal powder based on iron.

3. A magnetic recording medium according to claim 1 or 2 wherein the abrasive particles are angular-shaped.

4. A magnetic recording medium according to claim 1 wherein said abrasive particles have an average particle diameter of between about 0.2 and about 0.5 microns.

* * * * *